Jan. 28, 1941.  A. J. PENICK ET AL  2,229,871

VALVE MECHANISM

Filed Jan. 24, 1938  2 Sheets-Sheet 1

Inventors
Arthur J. Penick
Kirby T. Penick

By Edward V. Hardway
Attorney

Jan. 28, 1941.  A. J. PENICK ET AL  2,229,871
VALVE MECHANISM
Filed Jan. 24, 1938  2 Sheets-Sheet 2
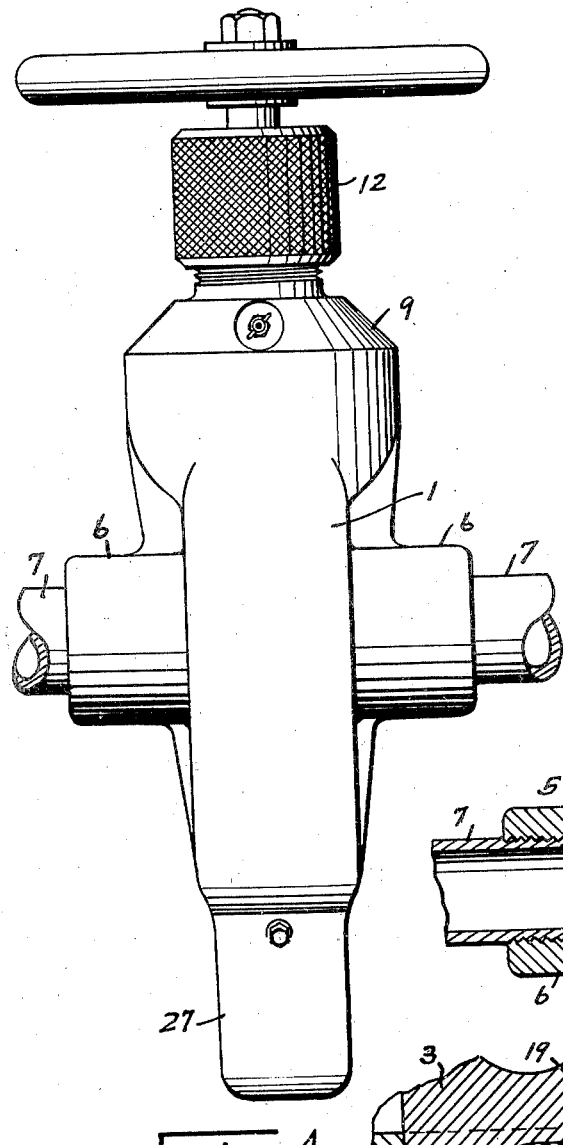
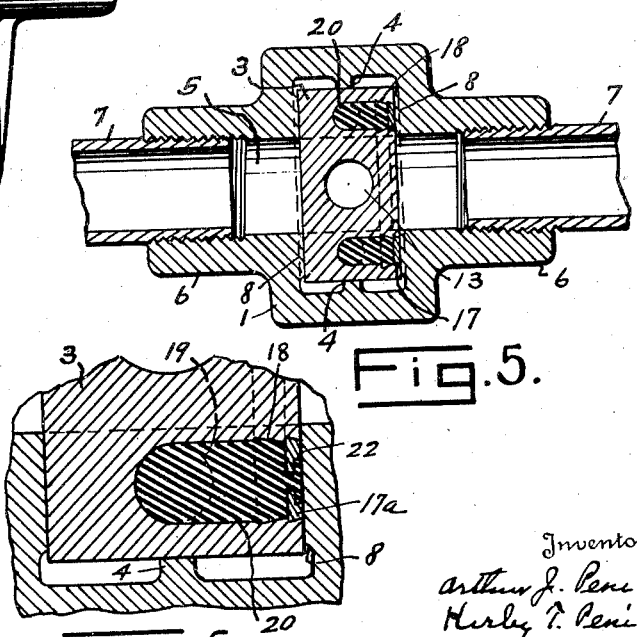
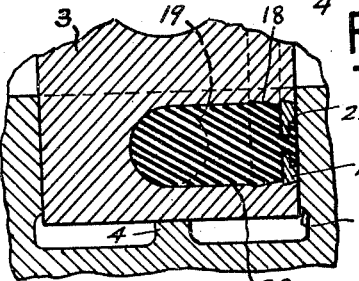
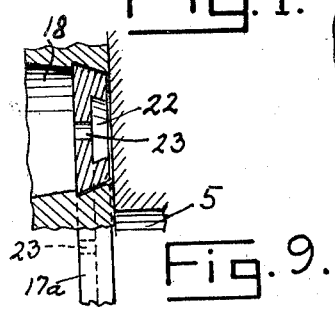

Patented Jan. 28, 1941

2,229,871

UNITED STATES PATENT OFFICE 2,229,871

VALVE MECHANISM

Arthur J. Penick and Kirby T. Penick, Houston, Tex.

Application January 24, 1938, Serial No. 186,625

4 Claims. (Cl. 251—59)

This invention relates to a valve mechanism.

An object of the invention is to provide a valve mechanism of the character described embodying a valve casing having a flowway therethrough, with a valve in the casing movable into active position to close the flowway and into inactive position, or open position, to clear the flowway and to provide a continuous passageway through the casing for the flow of fluid, said mechanism embodying novel means for forming fluid tight joints between the valve and the casing seats around the flowway when the valve is closed.

Another object of the invention is to provide a valve mechanism embodying a casing having a flowway therethrough and a valve movable into inactive position to open said flowway and into active position to close the flowway, said valve having a side seal ring arranged to surround the flowway, when in active position and means for applying pressure to the ring to seat it firmly against one of the casing seats and, by the reaction of the pressure, to seat the valve firmly against the other of said seats whereby to form fluid tight seals between the valve and casing when the valve is in closed position.

It is another object of the invention to provide means whereby said pressure will be relieved upon initial movement of the valve toward open position to permit free movement of the valve.

With the above and other objects in view the invention has particular relation to certain novel features of construction, operation and arrangement of parts, an example of which is given in this specification and illustrated in the accompanying drawings wherein:

Figure 4 shows a side view of the valve mechanism.

Figure 5 shows a sectional view taken on the line 5—5 of Figure 1.

Figure 6 shows an enlarged transverse sectional view of still another embodiment taken on the line 5—5 of Figure 1.

Figure 7 shows a fragmentary sectional view of still another embodiment, showing the valve in closed position.

Figure 8 shows a similar fragmentary sectional view showing the valve in partly open position, and Figure 9 shows a fragmentary perspective view showing the seal ring illustrated in Figure 6.

Referring now more particularly to the drawings wherein like numerals of reference designate the same parts in each of the figures, the numeral 1 designates a valve casing which is approximately rectangular in cross-sectional contour and which is formed with the valve chamber 2 therein in which valve 3 is mounted to move. The valve casing has the inside guide ribs 4, 4, one on each side, extending longitudinally of the casing against which the side faces of the valve contact, said ribs forming guides for the valve and reducing the frictional area.

Figure 1:
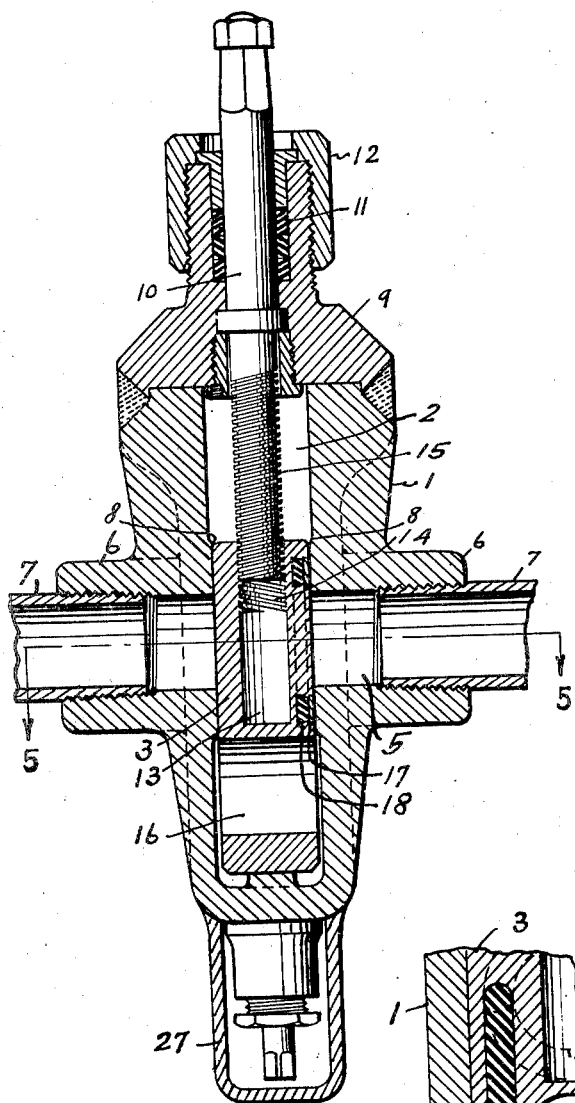
Figure 1 shows a longitudinal sectional view of the valve casing and valve.
Figure 2:
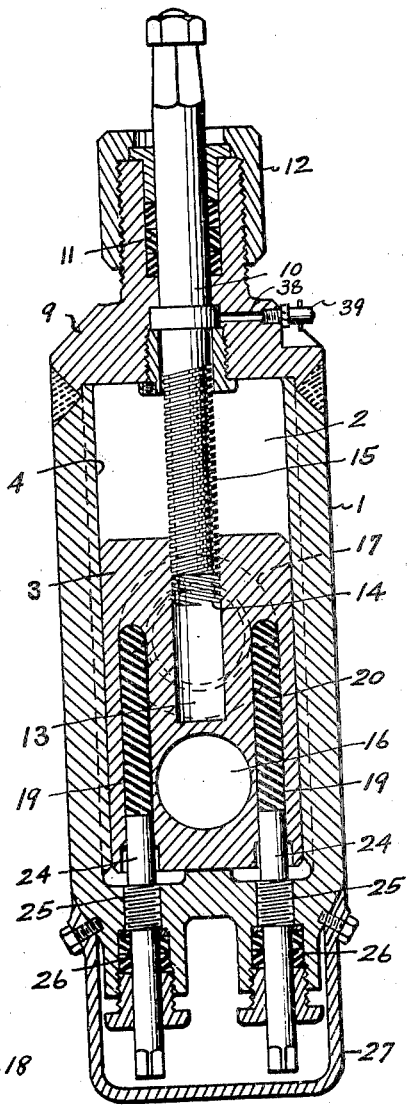
Figure 2 shows a longitudinal sectional view taken at right angles to the view shown in Figure 1.

The casing has the flowway 5 therethrough and the outwardly extended connections 6, 6, around the flowway into which the inner ends of the sections 7, 7 of the flow pipe are threaded. Around the flowway 5 the walls of the casing are slightly inwardly thickened forming the annular valve seats 8, 8. On the valve casing there is a bonnet 9 which may be secured thereto in any preferred manner. As shown in Figures 1 and 2, the bonnet is welded on to the casing. There is an axial valve stem 10 extending through the bonnet and into the chamber 2. This stem 10 has a swivelling connection with the bonnet and is surrounded by a stuffing box 11 which is maintained in assembled relation by means of the cap 12 which is screwed onto the outer reduced end of the bonnet. The valve 3 is provided with a deep socket 13 whose outer end has the internal coarse threads 14. The inner end of the valve stem has the coarse external threads 15 which intermesh with the threads 14 whereby upon turning movement of the stem 10 the valve may be shifted into active position to close the flowway 5 or into inactive position to open said flowway. The valve member is provided with a transverse opening 16 positioned to align with the flowway 5 when the valve is in said inactive position whereby a smooth continuous conduit will be provided through the valve casing. The chamber 2 will thus be closed off from said conduit to prevent the escape of foreign matter from the liquid being conducted into said chamber to prevent congestion of such material in the chamber so that foreign matter will not collect and interfere with the valve movements.

The valve has a side seal ring 17 countersunk into one side thereof and having a dovetailed connection therewith to prevent displacement and at the same time to permit a slight outward movement of said seal ring. The seal ring 17 incloses an annular chamber 18 in the valve which is covered by the seal ring. On opposite sides of the opening 16 the valve has the bores 19 extending from the end thereof and whose inner ends are outwardly turned into the chamber 18. These bores are filled with a fluid. This fluid may be a semi-solid such as a rubber 20, as shown in Figures 1, 2, 3, 5 and 6 or a suitable liquid as 21 as shown in Figures 7 and 8. This fluid also fills the chamber 18.

As shown in Figures 6 and 9 the seal ring 17a has an external annular groove 22 therearound which is connected with the chamber 18 by means of the ports 23 and the rubber, or other material, also fills the groove 22 through the ports 23.

In the form shown in Figures 1 and 2 there are the stationary plungers 24 anchored to the end of the casing by means of threads 25 whereby said plungers may be suitably adjusted to take up for loss of the material 20. These plungers are aligned with the bores 19. When the valve is actuated into active position, as shown in Figures 1 and 2 the plungers 24 enter the bores 19 and a compressive force is thereby applied to the material 20 placing said material under compression which is exerted against the seal ring 17 forcing said ring out closely against its opposing seat 8 and the reaction of the pressure of the material in the chamber 18 will be effective to firmly seat the opposite side of the valve against its opposing seat 8 thus forming close fitting seals to prevent the escape of the fluid flowing through the conduit 5. Upon initial movement of the valve toward inactive position, the pressure of the material 20 will be immediately released thus relieving its pressure against the seal ring 17 so as to reduce the friction and to permit the valve to easily move toward inactive position.

In the form shown in Figures 1 and 2, the plungers are outwardly extended and surrounded by stuffing boxes 26 and the outwardly extended ends of the plungers are formed to receive a wrench, as shown in Figures 1 and 2, whereby the plungers may be suitably adjusted. The stuffing boxes and outwardly extending ends of the plungers are inclosed by a suitable hood 27 which may be bolted onto the valve casing. In the form shown in Figure 3, the plungers 24a have a screw threaded connection with the valve casing 1 but their outer ends are formed with sockets 24b to receive a socket wrench for the adjustment of the plungers, otherwise the construction shown in Figure 3 is the same as that shown in Figures 1 and 2.

Figure 3:
Figure 3 shows a fragmentary longitudinal sectional view of another embodiment.

The construction shown in Figure 6 may be the same as that shown either in Figures 1 and 2 or shown in Figure 3, the only difference being that in this form the rubber 20 fills the groove 22 and thus forms an efficient seal with one of the seats 8 when the valve is in active position. In the form shown in Figures 7 and 8 there are the plungers 28 fitted into the outer ends of the bores 19. These plungers are retained against displacement from said bores by means of glands 29 which are screwed into the outer end of the bores and against which the plungers 28 may abut. The inner ends of the plungers 28 are equipped with conventional cup rings 30 formed of resilient material and said plungers have axial ducts 31 extending entirely therethrough whose outer ends are closed by the inwardly opening ball valves 32 which are retained against displacement by the valve cages 33 and said valves are normally held closed by the pressure springs 34. In this form there are plungers 35 anchored to the end of the casing by screw threads for adjustment. When the valve, of this form, moves to active position the plungers 35 will contact against the cages 33 and force the corresponding plungers 28 inwardly thus placing the fluid 21 under compression which will be transmitted to the fluid in the chamber 18 thus forcing the seal ring 17, and the valve firmly against their respective seats so as to form fluid tight joints as and for the purpose hereinabove explained.

Each plunger 35 has an axial duct 36 therethrough threaded into the outer end of which there is a conventional connection 37 through which additional liquid may be forced into the corresponding bore 19 to replace any loss of such liquid.

The swivelling connection between the valve stem 10 and the bonnet 9 may be supplied with a lubricant through the radial duct 38 as shown in Figure 2 into the outer end of which the filling connection 39 is screwed.

The drawings and description disclose what is now considered to be preferred forms of the invention by way of illustration only while the broad principle of the invention will be defined by the appended claims.

What we claim is:

1. Valve mechanism comprising a valve casing having a flowway therethrough, a valve in the casing movable into active position to close said flowway and into inactive position to open the flowway, said valve having an annular chamber and a seal ring having an external groove and ports through said ring inclosing the chamber, means including a pressure transmitting medium in the chamber effective to move the seal ring into close contact with the chamber wall around the flowway and flow through the ports into the groove when the valve is moved to said active position.

2. A valve assembly comprising a valve casing having a flowway therethrough, a valve in the casing movable into active position to close the flowway and into inactive position to open the flowway, said valve having an annular chamber and a seal ring enclosing the chamber on the valve, said valve having conduits leading from said annular chamber extending through the valve and terminating in a compression chamber, a piston in the casing formed to enter said compression chamber when the valve is in the active position, and a pressure transmitting medium in said annular chamber, conduit, and compression chamber.

3. A valve mechanism comprising a valve casing having a flowway therethrough, a valve in the casing movable into active position to close the flowway and into inactive position to open the flowway, said valve having an opening positioned to align with the flowway when the valve is in said inactive position, said valve having an annular chamber and a seal ring enclosing the chamber on the valve, said valve having conduits leading from said annular chamber extending through the valve and terminating in compression chambers, pistons in the casing formed to enter said compression chambers when the valve is in the active position, and a pressure transmitting medium in said annular chamber, conduits, and compression chambers.

4. A valve mechanism comprising a valve casing having a flowway therethrough, a valve in the casing movable into active position to close the flowway and into inactive position to open the flowway, said valve having an opening positioned to align with the flowway when the valve is in said inactive position, said valve having an annular chamber and a seal ring enclosing the chamber on the valve, said valve having conduits leading from said annular chamber extending through the valve around the opening and terminating in compression chambers, and a pressure transmitting medium formed of elastic material in said annular chambers, conduits and compression chambers, and means associated with the casing and the compression chambers whereby said medium is compressed when the valve is in the active position.

ARTHUR J. PENICK.
KIRBY T. PENICK.